US007028032B1

(12) United States Patent
Diedrich et al.

(10) Patent No.: US 7,028,032 B1
(45) Date of Patent: Apr. 11, 2006

(54) METHOD OF UPDATING NETWORK INFORMATION ADDRESSES

(75) Inventors: Richard Alan Diedrich, Rochester, MN (US); Eric John Nelson, Rochester, MN (US); Jeffrey Michael Ryan, Byron, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/407,538

(22) Filed: Sep. 28, 1999

(51) Int. Cl.
*G06F 17/18* (2006.01)
(52) U.S. Cl. .......................... 707/10; 715/513; 709/245
(58) Field of Classification Search ................. 707/500, 707/501.1, 513, 10; 709/245; 715/500, 715/501.1, 513
See application file for complete search history.

(56) References Cited

U.S. PATENT DOCUMENTS

| | | | | |
|---|---|---|---|---|
| 5,813,007 | A * | 9/1998 | Nielsen | 707/10 |
| 5,895,471 | A | 4/1999 | King et al. | |
| 5,917,491 | A * | 6/1999 | Bauersfeld | 345/810 |
| 5,918,237 | A | 6/1999 | Montalbano | |
| 5,963,964 | A * | 10/1999 | Nielsen | 707/501.1 |
| 5,978,828 | A * | 11/1999 | Greer et al. | 709/224 |
| 6,032,162 | A * | 2/2000 | Burke | 715/501.1 |
| 6,041,360 | A * | 3/2000 | Himmel et al. | 709/245 |
| 6,408,316 | B1 * | 6/2002 | Himmel et al. | 715/501.1 |
| 6,526,424 | B1 * | 2/2003 | Kanno et al. | 715/512 |
| 6,535,912 | B1 * | 3/2003 | Anupam et al. | 709/217 |
| 6,544,295 | B1 * | 4/2003 | Bodnar | 395/200.48 |

OTHER PUBLICATIONS

Maarek et al., "Automatically Organizing Bookmarks per Contents", May 1996, Computer Networks and ISDN Systems, vol. 28, issues 7-11, pp. 1-17.*

* cited by examiner

Primary Examiner—Sanjiv Shah
(74) Attorney, Agent, or Firm—Patterson & Sheridan, LLP

(57) ABSTRACT

The present invention relates to a method and program product for facilitating the maintenance of current bookmarks and preventing the loss of information associated with a bookmark. In one aspect, the invention bookmarks a Uniform Resource Locator (URL) associated with one or more HTML documents at a user's request and creates a database table containing each bookmarked URL. The source code of the bookmarked URL is scanned for embedded links which are stored in the table according to the related bookmarked URL. To ensure that the bookmarks are current, a periodic verification of the status of a bookmarked URL is performed. A change in the location or/and contents of the one or more bookmarked HTML documents results in one or more actions to prevent the loss of data to the user. In one embodiment, the database table is refreshed to reflect any changes to the content of the HTML documents. In another embodiment, where a bookmarked HTML document has been moved to a new URL, the table is updated with a forwarding URL, i.e., the original URL is replaced with the new URL. Where a forwarding URL is not available, a backup document containing the stored embedded links related to the original URL is created.

42 Claims, 6 Drawing Sheets

Fig. 5

| BOOKMARK | TIMESTAMP | CONFIGURATION LIMIT | LINK 1 | LINK 2 | LINK 3 | ... | LINK N |
|---|---|---|---|---|---|---|---|
| BOOKMARK 1 | TIMESTAMP 1 | CONFIGURATION LIMIT | LINK 1 | LINK 2 | LINK 3 | --- | LINK N |
| BOOKMARK 2 | TIMESTAMP 2 | CONFIGURATION LIMIT | LINK 1 | LINK 2 | LINK 3 | --- | LINK N |
| --- | --- | --- | --- | --- | --- | --- | --- |
| BOOKMARK N | TIMESTAMP N | CONFIGURATION LIMIT | LINK 1 | LINK 2 | LINK 3 | --- | LINK N |

| HTTP://WWW.BOOKMARK1.COM | 3 | HTTP://WWW.EMBEDDED LINK 1.COM | HTTP://WWW.EMBEDDED LINK 2.COM | HTTP://WWW.EMBEDDED LINK 3.COM | HTTP://WWW.EMBEDDED LINK 4.COM |
|---|---|---|---|---|---|
| HTTP://WWW.BOOKMARK2.COM | 3 | HTTP://WWW.EMBEDDED LINK 1.COM | HTTP://WWW.EMBEDDED LINK 2.COM | HTTP://WWW.EMBEDDED LINK 3.COM | HTTP://WWW.EMBEDDED LINK 4.COM |
| HTTP://WWW.BOOKMARK3.COM | 3 | HTTP://WWW.EMBEDDED LINK 1.COM | HTTP://WWW.EMBEDDED LINK 2.COM | HTTP://WWW.EMBEDDED LINK 3.COM | HTTP://WWW.EMBEDDED LINK 4.COM |

| VERIFICATION LOG | |
|---|---|
| ORIGINAL BOOKMARKED LINK | ACTION TAKEN |
| [BOOKMARK 1] | VERIFIED:[DATE]<br>ACTION: [UPDATED] OR<br>[REPLACED WITH TEMPORARY HTML PAGE] OR [NONE] |
| [BOOKMARK 2] | VERIFIED:[DATE]<br>ACTION: [UPDATED] OR<br>[REPLACED WITH TEMPORARY HTML PAGE] OR [NONE] |
| | |
| [BOOKMARK N] | VERIFIED:[DATE]<br>ACTION:[UPDATED] OR<br>[REPLACED WITH TEMPORARY HTML PAGE] OR [NONE] |

*Fig. 7*

| VERIFICATION LOG | |
|---|---|
| ORIGINAL BOOKMARKED LINK | ACTION TAKEN |
| HTTP://WWW.BOOKMARK 1.COM | VERIFIED: JULY 23, 1999 - 12:00 AM<br>ACTION: REPLACED BOOKMARK WITH TEMPORARY HTML PAGE |
| HTTP://WWW.BOOKMARK 2.COM | VERIFIED: JULY 23, 1999 - 12:01 AM<br>ACTION: UPDATED BOOKMARK WITH FORWARDING PAGE |

*Fig. 8*

METHOD OF UPDATING NETWORK INFORMATION ADDRESSES

BACKGROUND OF THE INVENTION

1. Field of the Invention

The present invention relates to the information processing field. More particularly, the invention relates to a mechanism for maintaining current bookmarks and mitigating or preventing the loss of information related to a bookmarked HTML page.

2. Background of the Related Art

Hypertext Markup Language (HTML) was developed to allow users on the Internet to easily navigate from within one document to another document. An HTML document is located at an address represented by a Universal Resource Locator (URL), and may reside on a user's own computer, or on another computer networked with the user's computer. In particular, the HTML document may reside on a neworked computer (called a host) with an Internet address. A logical grouping of HTML documents on a given host is known as a website and all websites taken together constitute the World Wide Web (WWW).

A user selects, loads and displays HTML documents utilizing software called a browser. HTML documents displayed by the browser generally contain areas that, when selected by a user, cause the browser to load and display other HTML documents. A selectable area (known as a hypertext link) may be textual, graphic, or generally any designated area of a displayed HTML document. Each hypertext link is associated with a URL of a destination HTML document, which is loaded and displayed when the link is selected by the user.

Occasionally, a user may find URLs of interest which merit revisiting. Therefore, the user needs a convenient method of storing and retrieving the URL for future use. One common technique of allowing the users to return to selected HTML document is called "bookmarking". At the user's request, the browser associates the selected URL with a word or phrase of a presently displayed HTML document and stores this data as a bookmark. The bookmark is stored in a bookmark file which is typically resident on the user's computer. At the user's request, a list of textual descriptions in the bookmark file is displayed as a bookmark list. Upon selecting one such description, the browser loads and displays the HTML file found at the associated URL. In this manner, the browser facilitates returning to a preferred URL.

A problem arises when the URL of a bookmark is changed and/or the contents of a bookmarked page are changed. In the former case, the user has lost the ability to retrieve the bookmarked URL and the embedded links associated with that URL. In the latter case, where the contents of a bookmarked page are changed, the user is still able to retrieve the bookmarked page but may have lost the ability to locate the URLs that were originally embedded in the bookmarked page as links, which have since been removed.

The problems associated with changing the URL of a bookmarked site, or the contents of the URL, are particularly detrimental in cases where the bookmarked URL constitutes an index page. In general, an index page is an HTML document having multiple links associated therewith, typically related by a common category. One example of an index page is Javagems having the URL "www.javagems.com". Javagems is a website having embedded links which are related to the Java programming language. Users typically bookmark this page or similar pages because they provide a convenient way of organizing and loading websites according to similar content. Thus, in cases where the bookmarked page becomes irretrievable due to a change in the URL, the user has lost access, not only to the bookmarked page, but to each of the associated and embedded links.

In an attempt to avoid any inconveniences to users, web page authors or administrators have developed some techniques whereby the detrimental effects associated with moving a web site may be avoided. One such technique is the use of a temporary forwarding page. A temporary forwarding web page is an HTML document that provides a forwarding URL at which the bookmarked site now resides. The forwarding web page is associated with the bookmarked site so that when a user evokes the bookmarking application of the browser to retrieve the URL which has since been moved, the browser downloads the temporary forwarding web page. Typically, the temporary page will provide a hypertext link associated with the forwarding URL, i.e., the new URL, at which the bookmarked web site is now located. The user may then select the link and be forwarded to the web page at its new location. Subsequently, the user may desire to bookmark the new URL, thereby updating the bookmark list to facilitate future visits. In some cases, the web author or administrator may automatically forward the user to the new URL upon activating the bookmarked URL by use of a redirect function enabled by HTML source code as is known in the art. Automatic forwarding obviates the need for the user to manually select the hyperlink associated with the forwarding URL.

While temporary forwarding pages may avoid some inconveniences of cases wherein a URL has been moved or changed, it is not a perfect solution. For instance, even where the web author or administrator provides a temporary forwarding page, the page is, by definition, not permanent. As a result, if the user does not return to the bookmarked site in a limited timeframe, the opportunity to locate the forwarding URL may be lost. Additionally, a temporary forwarding page may not be provided. In such cases, the user is left without a remedy except to locate the web site by manually searching. Further, in the event that the site has been deleted as opposed to moved, the user also loses access to any embedded links associated with the bookmarked site.

Therefore, there is a need in the art for providing a method for maintaining an updated bookmark list.

SUMMARY OF THE INVENTION

The present invention generally relates to a method and program product for facilitating the maintenance of bookmarks and preventing the loss of information associated with a bookmark.

In one aspect of the invention, the invention verifies a bookmarked network information address, e.g., a Uniform Resource Locator (URL), associated with information, e.g., an HTML document, at a user's request. A verification scan is performed by a program to determine the status and currency of each stored URL and the contents of its related HTML documents. The verification scan comprises the steps of storing the bookmarked network information address in a data structure and then determining whether the bookmarked network information address is retrievable by automatically searching for the information located at the bookmarked network information address. The bookmarked network information address is retrievable if the bookmarked network information address is located by the program. If the bookmarked network information address is retrievable, it is determined whether the information has been moved to a different network information address. In one embodiment, if the information has been moved to a different network information address, the bookmarked network information address is replaced with the different network information address in the data structure.

In another aspect of the invention, the information located at the bookmarked network information address is scanned for embedded network information addresses which are then stored in a data structure. In the event the bookmarked network information address is irretrievable, a document containing the embedded network information addresses is generated and displayed to a user attempting to access the bookmarked network information address.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 5 is a data structure of the present invention for storing bookmarked URLs and related information.

FIG. 6 is an illustration of the data structure of FIG. 5.

FIG. 7 is a verification log of the present invention.

FIG. 8 is an illustration of the verification log of FIG. 7.

DETAILED DESCRIPTION OF THE PREFERRED EMBODIMENT

Figure 1:
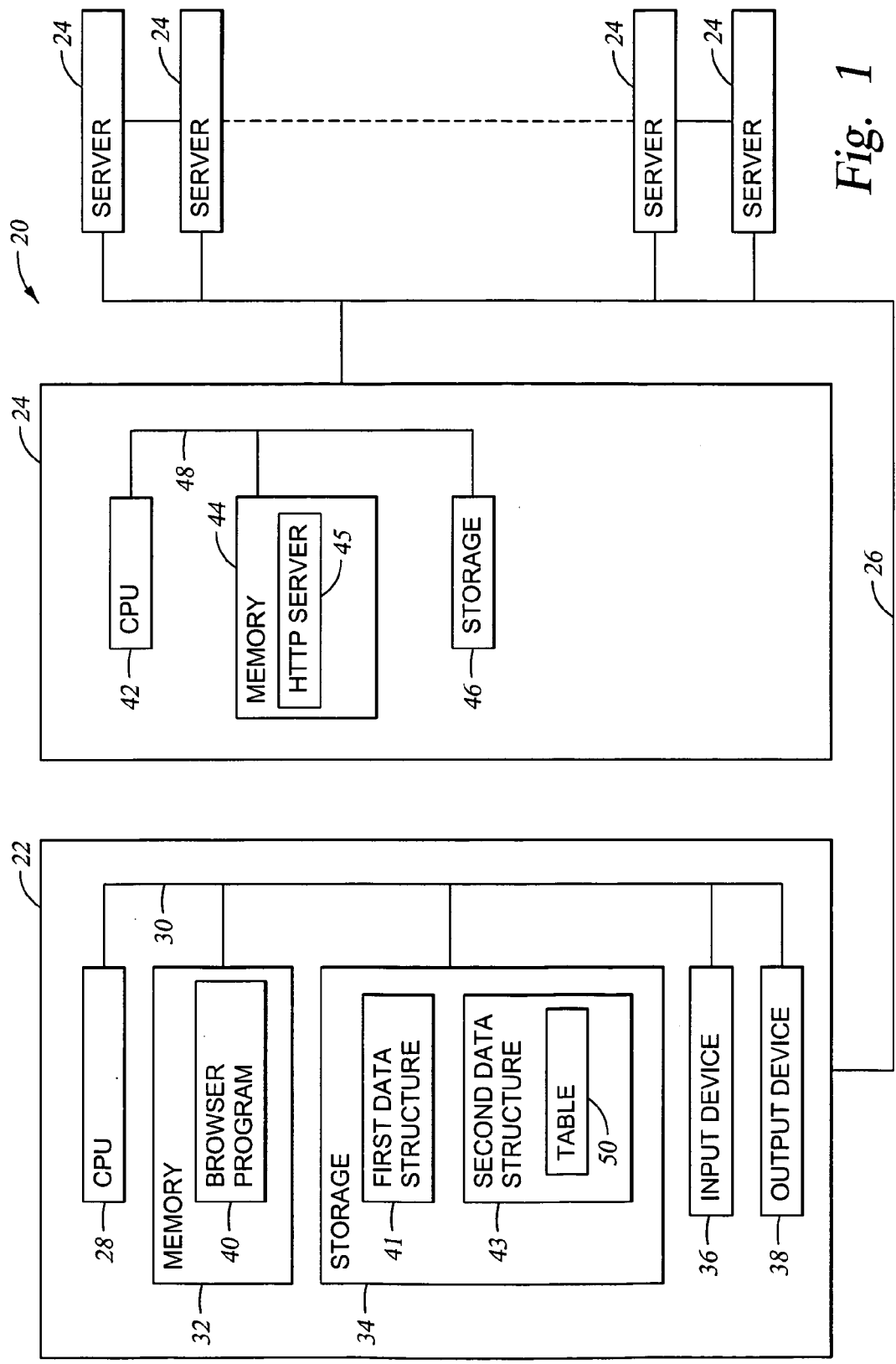
FIG. 1 is a block diagram showing a client computer and a connected server computer.

In general, the present invention relates to a method, and software implementation of the method, that facilitates the maintenance of current bookmarks and prevents the loss of information associated with a bookmark. The inventive method bookmarks a network information address, e.g., a Uniform Resource Locator (URL), associated with information, e.g., an HTML document, at a user's request and creates a database table containing each bookmarked URL. The source code of the HTML document is scanned for embedded links which are stored in the table according to the related bookmarked URL. To ensure that the bookmarks are current, a periodic verification of the status of a bookmarked URL is performed. A change in the status of the bookmark occurs when the contents of the HTML document of a bookmarked URL are altered and/or when the bookmarked HTML documents are moved to another URL. In the former case, where the site has not been moved but the contents of the bookmarked site have been changed since the last visit to the site, the database table is refreshed to reflect the changes. In the latter case, where the URL has been changed, the invention determines whether a forwarding URL (i.e., the new URL at which the HTML document is now located) is available. If so, the bookmark is updated by associating the bookmark with the new URL, i.e., the original URL is replaced with the forwarding/new URL. Thus, when the bookmark is next selected by a user through a browser, the browser will download the forwarding/new URL, thereby obviating the need for manual intervention in updating the bookmark list. In the event that the bookmarked URL becomes irretrievable because a forwarding/new URL is not provided, a temporary HTML document is generated using the stored data from the table, i.e., the links related to the bookmarked URL, thereby avoiding the possibility of losing the information of the originally bookmarked URL. The temporary HTML document contains the hypertext links of the lost site at the last verification. The number of hypertext links in the temporary HTML document can be limited by a configuration limit as determined by a user.

As will be described in detail below, aspects of the preferred embodiment pertain to specific method steps implementable on computer systems. In an alternative embodiment, the invention may be implemented as a computer program-product for use with a computer system. The programs defining the functions of the preferred embodiment can be delivered to a computer via a variety of signal-bearing media, which include, but are not limited to, (I) information permanently stored on non-writable storage media (e.g., read-only memory devices within a computer such as CD-ROM disks readable by CD-ROM drive); (ii) alterable information stored on writable storage media (e.g., floppy disks within diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent alternative embodiments of the present invention.

FIG. 1 depicts a data processing system 20 in which the preferred embodiment may be implemented. In general, the data processing system 20 includes a client computer 22 and at least one server computer 24 (five such servers 24 are shown). The client computer 22 and the server computer 24 may be components of the same computer system or may be separate components connected via a network 26, such as the Internet. The client computer 22 includes a Central Processing Unit (CPU) 28 connected via a bus 30 to memory 32, storage 34, input device 36 and output device 38. The input device 36 can be any device to give input to the client computer 22. For example, a keyboard, keypad, light pen, touch screen, button, mouse, track ball, or speech recognition unit could be used. The output device 38 is preferably any conventional display screen and, although showing separately from the input device 36, the output device 38 and input device 36 could be combined. For example, a display screen with an integrated touch screen, and a display with an integrated keyboard, or a speech recognition unit combined with a text speech converter could be used. Memory 32 is preferably a random access memory sufficiently large to hold the necessary programming and data structures of the invention. While memory 32 is shown as a single entity, it should be understood that memory 32 may in fact comprise a plurality of modules, and that the memory 32 may exist at multiple levels, from high speed registers and caches to lower speed but larger DRAM chips. The memory 32 contains a browser program 40 that, when executed on the CPU 28, provides support for navigating between the various servers 24 and locating addresses at one or more of the servers 24. The contents of memory 32 can be loaded from and stored to the storage 34 as CPU 28 has a need for it.

In the preferred embodiment, storage 34 is DASD (Direct Access Storage Device), although it could be other storage such as floppy disc drives or optical storage. Although storage 34 is shown as a single unit, it could be any combination of fixed and/or removable storage devices, such as fixed disc drives, floppy disc drives, tape drives, removable memory cards, or optical storage. Memory 32 and storage 34 could be part of one virtual address space spanning multiple primary and secondary storage devices. The storage 34 contains various data structures and, as shown in FIG. 1, storage 34 contains at least a first data structure 41 and a second data structure 43, wherein the second data structure contains a table 50.

Each server computer 24 generally comprises a CPU 42, memory 44, and storage 46 coupled to one another by a bus 48. The memory 44 is random access memory sufficiently large to hold the necessary programming and data structures that are located on the server computer 24 according to a network information address, e.g., a URL. As shown, the memory 44 includes an HTTP server process 45 adapted to service requests from the client computer 22 regarding HTML documents. The programming and data structures may be accessed and executed by the CPU 42 as needed. The storage 46 is provided for long-term storage of implementation code and data needed during operation.

Although a specific hardware configuration is shown for data processing system 20, a preferred embodiment of the present invention can apply to any hardware configuration that allows the browsing of documents, regardless of whether the computer system is a complicated, multi-user computing apparatus, a single-user workstation, or a network appliance that does not have non-volatile storage of its own.

Figure 3:
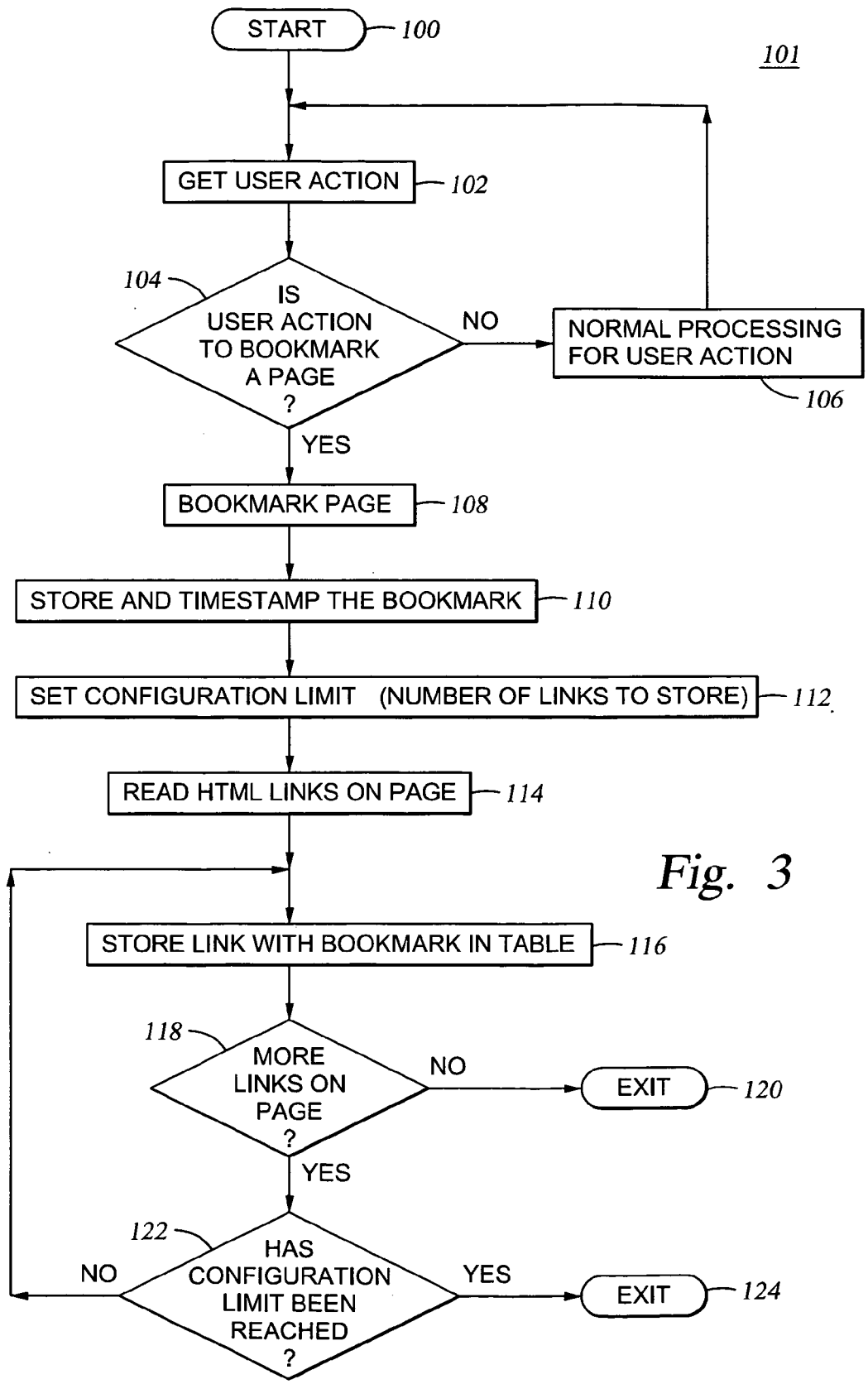
FIG. 3 is a flowchart of a processing program for enabling user interaction with the client computer according to the present invention.

The browser program 40 may be initiated by a user on the client computer 22 and used to navigate between servers 24. FIG. 3 is a flow chart of a process 101 that occurs as a user operates the browser 40 on the client computer 22. The description of FIG. 3 will be made with occasional reference to FIG. 1 where appropriate. Entry into process 101 is depicted in block 100. During operation, the user initiates various actions which are executed by the browser 40 as represented by block 102. Upon locating a desired web page, i.e., an HTML document, located on a server 24, the user may elect to bookmark the page for the purpose of facilitating future visits. At block 104, if the user action is anything other than to bookmark the web page the browser 40 continues with normal operation according to the specified action as represented by block 106. However, if the action is to bookmark the page, the browser process proceeds to block 108 indicating that the page is bookmarked.

Figure 2:
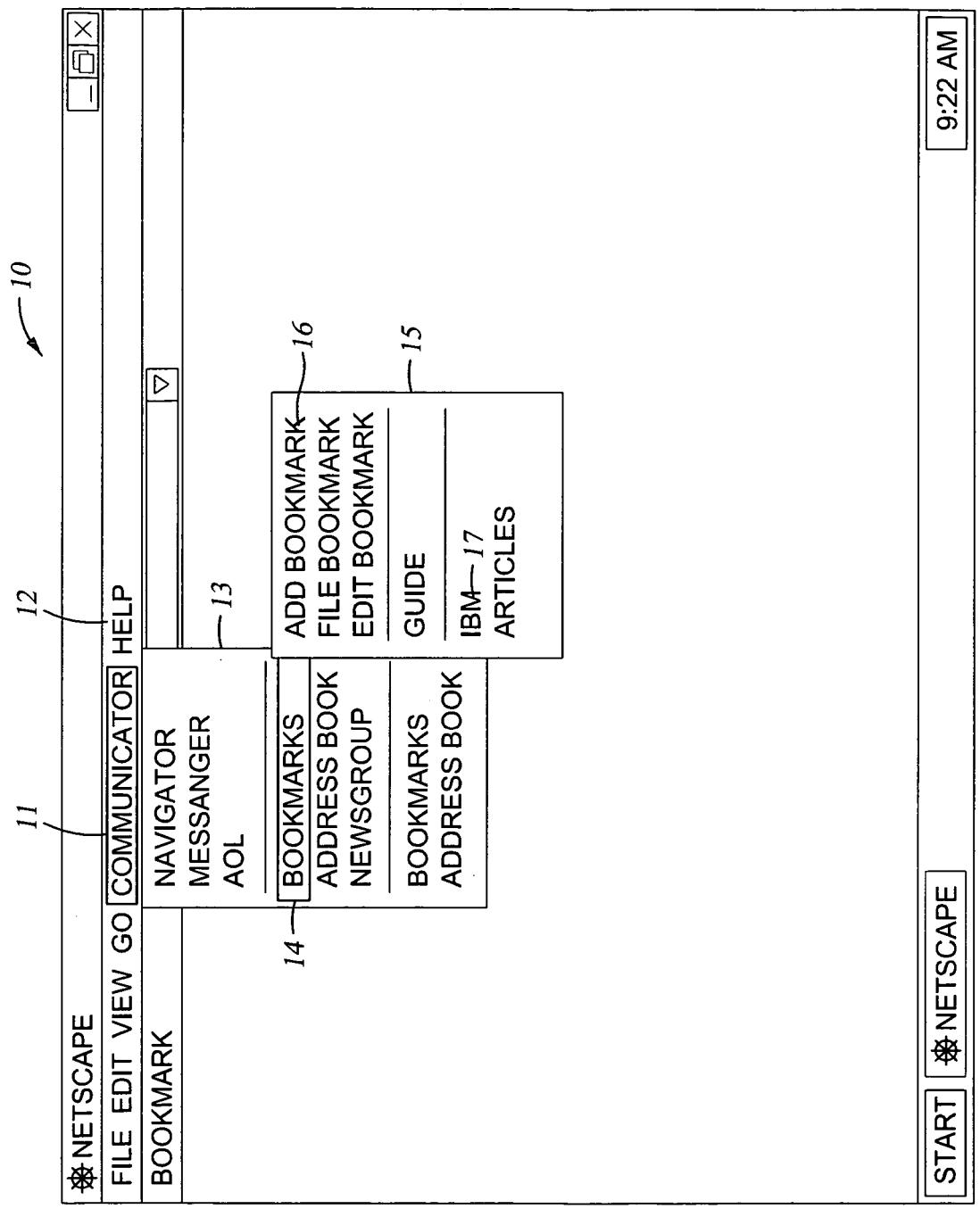
FIG. 2 is a Graphical User Interface for a prior art browser.

An illustration of bookmarking is provided with reference to FIG. 2. FIG. 2 depicts a schematic embodiment of a Graphical User Interface (GUI) 10 for a browser, such as the Netscape 6.1 browser, developed by Netscape Communications, Inc., which may be used to advantage with the invention and displayed by the output device 38. In order to store a bookmark for the presently displayed HTML document, the user highlights and activates the word Communicator 11 in the title bar 12. This may be accomplished, for example, by utilizing a mouse or keyboard. Upon selecting the word Communicator 11, a window 13 appears. The user then selects the word Bookmark 14 in the window 13 causing a second window 15 to appear. The user then selects the words Add Bookmark 16 in the second window 15 and may then be provided the option of providing a brief description to be associated with the new bookmark and/or create a file in which to store the bookmark. Alternatively, the browser 40 may automatically associate the Title information of the URL, which is embedded in the HTML file between the TITLE tags. In either case, the bookmarked URL is then placed in the first data structure 41 (shown in FIG. 1) which can be stored in storage 34 for periodic retrieval. Once the bookmark has been added to the bookmark list, the user may retrieve the bookmark at will. Thus, referring still to FIG. 2, to retrieve the document related to a stored bookmark the user again selects the word Bookmarks 14 in the title bar 12 of the GUI 10. The user then selects the title 17 of the HTML page sought to be loaded. The URL associated with the selected bookmark is then used to load the appropriate HTML document. The HTML document may be loaded from a cache, or downloaded over a network from another computer or a host, depending on where the HTML document resides. As will be described below, the invention ensures that the stored bookmarks and their related contents are kept kept current and that, where necessary, the content is stored to a backup document retrievable by the user.

According to the invention, the network information address of the bookmarked page, e.g., the URL, is also stored in a second data structure 43, such as a database table 50, generated by the client computer 22, as indicated by block 110. In one embodiment, the first and the second data structure 41, 43 are the same. Preferably, the second data structure 43 is stored locally on the client computer 22 such as in storage 34, as shown in FIG. 1. FIG. 5 depicts an illustrative representation of the second data structure as a database table 50 containing multiple data fields 52, 54, 56 and 58 at least one of which relates to the URL of the bookmarked page. Thus, table 50 comprises a URL data field 52 that preferably contains the full bookmarked URL, i.e., the protocol and domain name. A timestamp data field 54 contains the date of the most recent changes made to the HTML document being bookmarked. The date may be provided by the server 24 on which the bookmarked HTML document resides. The table 50 also includes a plurality of hyperlink data fields 58 for containing one or more links embedded in the bookmarked HTML document as well as a configuration limit data field 56 indicating how many links are to be stored as will be described in greater detail below.

Returning again to FIG. 3, in block 110, the timestamp is preferably entered at the time the HTML document is bookmarked. Then, in block 112, the user sets the configuration limit indicating the number of links to be retrieved from the bookmarked page by the browser 40 and stored in the table 50 by the client computer 22. The user is given the option not to limit the number of links to be retrieved and stored from the bookmarked page, thereby allowing all the links associated with bookmarked page to be stored in the table 50. Further, although depicted as being performed subsequent to block 110, it is understood that block 112 may be performed by the user prior to entry at block 100. Additionally, while the configuration limit may be independently selected for each bookmark, for ease of use, the configuration limit is generally the same for each bookmark and need only be input once by the user. The user may then periodically adjust the configuration limit as the need should arise. In one embodiment, the configuration limit is changed by opening a preference file selected from the browser menu.

In block 114, the browser 40 determines the presence of embedded hyperlinks in the bookmarked HTML document. This is performed by accessing and scanning the source code of the HTML for anchor tags having HREF attributes. Each such anchor tag represents an embedded link having a destination URL. Upon detecting an anchor tag, the browser 40 stores the link as shown by block 116. The link is stored in the hyperlink data field 58 of table 50 with the associated URL of the bookmarked page (contained in the URL data field 52) as shown in FIG. 5. Subsequently, the browser 40 scans the source code of the bookmarked HTML document for additional embedded links, as indicated by block 118. If no additional links are found, the routine is exited, at block 120, and the browser 40 resumes normal operation according to the actions of the user. If, however, another link is found, the browser 40 determines, in block 122, whether the configuration limit, contained in the configuration limit data field 56 of the table 50, has been reached. If so, the routine is exited at block 124. If the configuration limit has not been reached, the process returns to block 116 to store the embedded link in the hyperlink data field 58. Thus, blocks 116, 118, and 122 comprise a loop that is repeated until all embedded links in the bookmarked HTML document are detected and stored or until the configuration limit is reached.

Subsequent to storing one or more bookmarks in the manner described above with reference to FIGS. 3 and 5, the HTML documents associated with the bookmarked URLs may be moved to a different URL and/or the contents of the HTML documents may be altered. As described above with reference to the prior art, such cases result in the user losing information contained in the bookmarked HTML document. The present invention mitigates or eliminates detrimental effects resulting from alterations to bookmarked pages by using a periodic verification scan.

Figure 4:
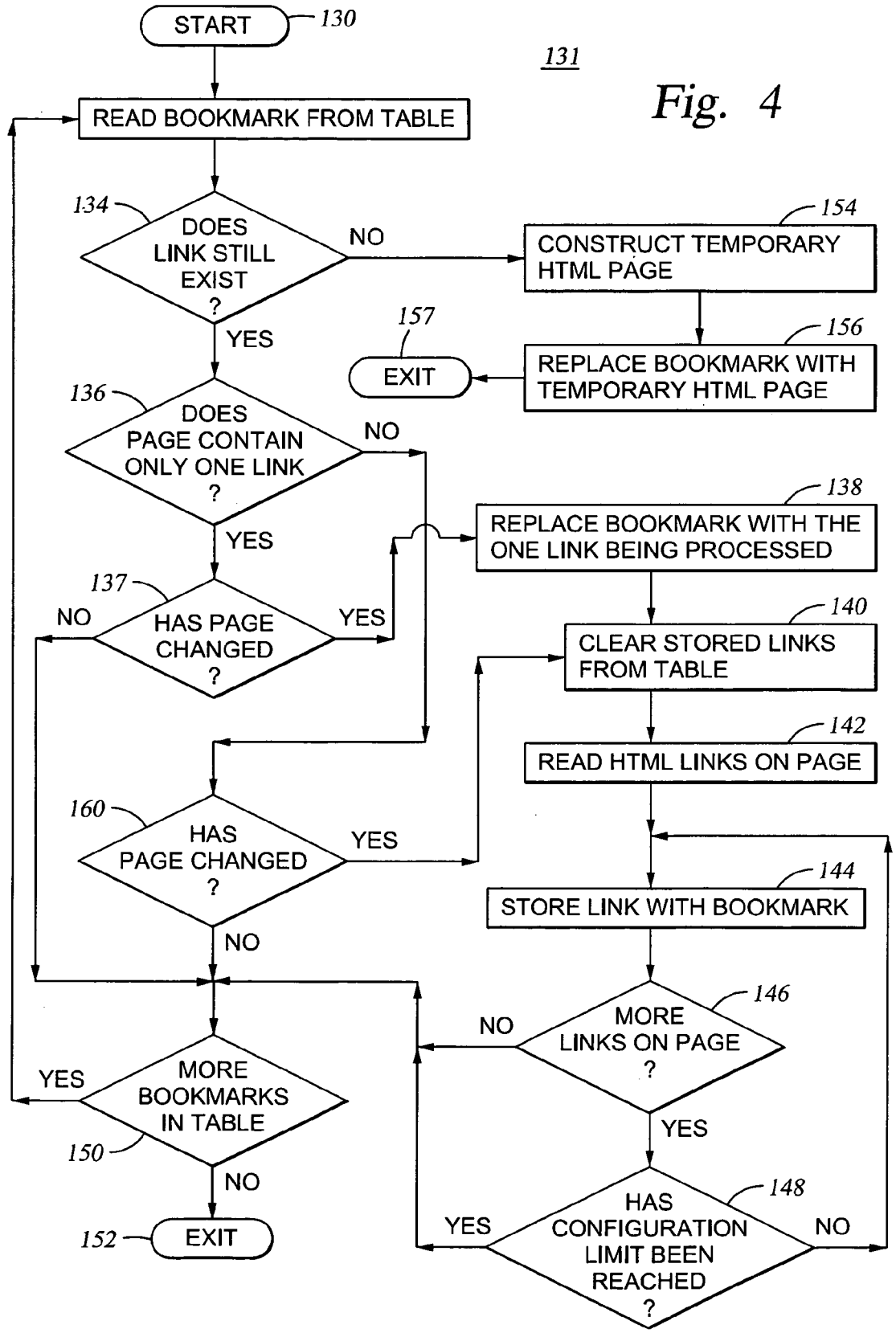
FIG. 4 is a flowchart of a processing program for performing verification scanning according to the present invention.

Referring now to FIG. 4, a flowchart depicting the process 131 for performing a verification scan is shown. The process 131 is generally a portion of browser program 40 or a callable routine that is executed by the browser program 40. The verification scan process 131 may be performed periodically at a frequency determined by the user. For example, the user may configure the client computer 22 to automatically execute the verification scan once per week at a designated time of day. The entry to the verification scan process 131 occurs at block 130 in FIG. 4. At block 132, the browser 40 retrieves a bookmarked URL from the URL data field 52 of the table 50. The browser 40 then, at block 134, determines whether the URL is still valid and retrievable. Thus, the browser 40 searches for and attempts to download the bookmarked URL. In cases where the bookmarked URL is irretrievable, i.e., the bookmarked URL does not exist, an error message will be returned to the browser 40. A returned error message prompts the process 131 to cause the browser 40 to create a temporary HTML document, as indicated by block 154. Preferably, the temporary HTML document is created and saved to the storage area in which table 50 is located, e.g., storage 34 of FIG. 1. The temporary HTML document contains each of the stored embedded links in table 50 that are associated with the original bookmarked page that has become irretrievable. As shown in block 156, the URL of the original bookmarked page stored in the table 50 is then replaced with the temporary HTML document, or more precisely, with the path name of the temporary HTML document. Additionally, the bookmarked URL in first data structure 41 of FIG. 1 is replaced with path name of the temporary HTML document. Thus, future attempts by the user to access the original bookmarked page will cause the browser 40 to load the temporary HTML document for the first data structure 41. As a result, the temporary HTML document allows the user to visit each of the links which were associated with the irretrievable bookmarked page and which would otherwise have been lost. Finally, the verification of process 131 is exited at block 157.

Returning now to block 134, if the process 131 determines that a bookmarked HTML document does exist, i.e., the HTML document was located, the browser 40 then determines whether the HTML document is the original page that was bookmarked by the user or whether the original bookmarked page has been moved to another location having a new URL. In the latter case, the URL being processed by the browser 40 is the same as the bookmarked URL, however, the HTML document is not the original document bookmarked by the user. Instead, the HTML document being accessed by the browser 40 is typically a forwarding page. Thus, the browser 40 must differentiate between the original bookmarked document and a forwarding page located at the URL of the original document. In one embodiment, the determination of the nature of the document being processed is made by scanning the source code of the HTML document for embedded links. In particular, the browser 40 determines, in block 136, whether the HTML document being scanned has only one embedded hypertext link. Typically, HTML documents having only a single link are forwarding pages and the single link is a forwarding link. However, as a check, the process 131 preferably determines whether the HTML document being processed has been changed, as shown by block 137, in cases where only one link is found. This determination may be made by requesting pertinent information from the server 24 on which the bookmarked HTML document is located. Specifically, the requested information pertains to the date and time of the last changes made to the HTML document. The date and time information returned from the server computer 24 to the client computer 22 can be then compared to the stored timestamp (contained in the timestamp data field 54 of the table 50). If the comparison indicates that the HTML document has been changed, the HTML document is assumed to be a forwarding page and the single link is assumed to be a forwarding URL, i.e., the new URL to which the original bookmarked HTML document has been moved. Accordingly, at block 138, the original stored bookmark in the table 50 and the first data structure 41 are replaced with the URL of the single link. If the comparison of the time and date indicates that the HTML document has not been changed, the bookmarked URL contained in the table 50 is determined to be the URL as originally bookmarked by the user. Subsequently, the process 131, in block 150, reviews the table 50 for the next stored URL. If another URL is found, the process 131 returns to block 132 to load and retrieve the bookmarked URL. If no other bookmarks are stored in the table 50, the process is exited at block 152.

If the original bookmarked page is replaced with the single detected link, as shown in block 138, the process 131 then clears the stored embedded links from the table 50 that were associated with the original bookmarked page, as shown in block 140. The table 50 is then updated with the current links embedded in the HTML document of the single link. This is done to ensure the table reflects the most recent changes made to the bookmarked page, if any. Thus, at block 142, the HTML document associated with the single link is scanned for embedded hypertext links by detecting the anchor tags having HREF attributes in the source code of the HTML document. At block 144, the first detected link is stored in the table 50 according to the associated HTML document. The HTML document is then checked for additional embedded links at block 146. If additional links are found, a determination is made as to whether the preset configuration limit has been reached at block 148. If the limit has not been reached, the link is stored in the table 50, as shown by block 144. Accordingly, blocks 144–148 comprise a loop that is iterated until all links on the HTML document are stored in the table 50 or until the configuration limit is reached.

Once all links on the bookmarked page are stored in the table 50 (block 146) or the configuration limit is reached (block 148), whichever occurs first, the process 131, at block 150, browser 40 determines whether additional bookmarks are stored in the table 50. If no additional bookmarks exist, the process 131 is exited at block 152. If additional bookmarks are found in the table 50, the browser 50 routine returns to block 132 to retrieve and access the next bookmarked URL in the table 50 and continue the processing as described above. In this manner, each bookmark stored in the table 50 (and the first data structure 41) which has been moved, is updated to reflect the new URL in the event a forwarding page is provided. Additionally, the related embedded links stored in the table 50 are cleared and the table 50 is updated with the current embedded links. Thus, the table 50 is refreshed to reflect changes in location of the bookmarked HTML document and to include all updated embedded links for each bookmarked page.

Returning again to block 136, if the process 131 finds that the bookmarked page contains more than one link, it is assumed that the bookmarked URL contained in the table 50 is active and is the address to the page originally bookmarked by the user. The process 131 then determines whether the HTML document associated with the bookmarked URL has been altered, as depicted by block 160. As noted above with reference to block 137, information regarding changes to the HTML document is typically provided by the server 24 on which the bookmarked HTML document is located. Thus, upon request by the client computer 22, the server 24 returns a date indicating the time of the last change to the bookmarked HTML document. This date is then compared to the stored timestamp (contained in the timestamp data field 54 of the table 50) associated with the bookmarked page. If the date returned by the server 24 and the timestamped date differ it is assumed the page has changed. If the HTML document has not been changed, the process 131 determines whether any other bookmarks are stored in the table 50, as shown by block 150. If so, the process 131 returns to block 132 to retrieve and access the next bookmarked URL in the table 50. If no other bookmarks are stored in the table 50, the process 131 is exited.

In the case where the bookmarked HTML document has been changed, as determined at block 160, the process described with reference to blocks 140–152 is performed to refresh the table 50. Thus, stored embedded links associated with the bookmarked page, which are contained in the embedded links data field 58, are cleared from the table 50 as shown in block 140. The table 50 is then updated with the current links embedded in the bookmarked HTML document. Thus, at block 142, the bookmarked HTML document is scanned for embedded hypertext links by detecting the anchor tags having HREF attributes in the source code of the HTML document. The first detected link is stored in the table 50 according to the associated bookmarked HTML document, as shown by block 144. The HTML document is then checked for additional embedded links at block 146. If additional links are found, a determination is made as to whether the preset configuration limit has been reached at block 148. If the limit has not been reached, the link is stored in the table 50, as shown by block 144. The loop comprising blocks 144–148 is iterated until all links on the bookmarked HTML document are stored in the table 50 or until the configuration limit is reached.

Once all links on the bookmarked page are stored in the table 50 (block 146) or the configuration limit is reached (block 148), whichever occurs first, the process 131 determines whether additional bookmarks are stored in the table 50, as shown by block 150. If no additional bookmarks exist, the process 131 is exited at block 152. If additional bookmarks are found in the table 50, the process 131 returns to block 132 to retrieve and access the next bookmarked URL in the table 50 and continue the processing as described above. Thus, blocks 140–148 act to refresh the table 50 to include all updated embedded links for each bookmarked page.

Accordingly, the process of FIG. 4 comprises one embodiment of the invention whereby the bookmarked pages are kept current and/or backup documents are generated. In this manner, each stored bookmark in the table 50 is verified and, if necessary, is updated with the current embedded hyperlinks.

When the user next logs on subsequent to a verification scan being performed, a verification log is generated by the client computer 22. One possible embodiment for a verification log 200 is shown in FIG. 7. The verification log 200 informs the user as to the various activities performed during the verification scan. The verification log 200 comprises at least a bookmark URL data field 202 indicating each of the URLs bookmarked by the user. The URL data field 202 comprises at least the domain name; alternatively, the full URL may be provided. Additionally, the verification log 200 comprises an activity data field 204 indicating the events of a verification scan. The activity data field 204 for each bookmark comprises a verification date and specifies the action taken by the process 131.

FIG. 8 illustrates the formatting for one illustrated embodiment of the verification log 200. The action taken with regard to a first URL, "http://www.Bookmark1.com", indicates that the bookmark was replaced with a temporary HTML file suggesting that the original bookmark could not be retrieved. The action taken with regard to a second URL, "http://www.Bookmark2.com", indicates that the bookmark has been moved and therefore the stored URL was replaced with a forwarding URL detected during the verification scan.

In order to prevent unwanted changes, the user is preferably given the opportunity to accept or reject the changes made during the verification scan. If the user rejects the changes, a backup file containing the original data is retrieved and the table is reformatted with the original data. If the user accepts the changes, the backup file may be deleted.

The present invention contemplates various additional and alternative embodiments which will become apparent to those skilled in the art. For example, the browser 40 need not scan and store the embedded links of each bookmarked URL as is performed in blocks 114 and 116 of FIG. 3. Thus, in an alternate embodiment, the browser 40 may store and verify only the URL bookmarked by the user without regard for any embedded links. During a subsequent verification scan, each bookmarked URL is then checked for changes indicating that the URL has been moved or deleted. Where an original bookmarked URL has been changed and a forwarding URL is available, the bookmarked URL may be updated with the forwarding URL. In the event the bookmarked URL has moved and no forwarding URL is detected by the browser 40, the browser 40 generates a temporary backup document to replace the bookmarked URL stored in the table 50. Upon logging on to the client computer 22, the user is notified of the changes to the bookmarks via the verification log 200.

In another embodiment, the invention contemplates verifying the status of each of the embedded links associated with the bookmarked page. That is, the embedded links may each be treated as a separate bookmark and subjected to a similar verification scan such as was described with reference to FIG. 4. However, such multilevel verification is not always desirable to the user whose primary interest is the bookmarked page. If the user has particular interest in a link embedded in the bookmarked page and desires to return to that link frequently, the user may choose to manually bookmark the link, thereby ensuring that it will be periodically verified according to the invention. Multilevel verification may also be undesirable to the user because of the resulting additional data contained in the verification log which the user may find superfluous and confusing. Thus, multilevel verification is preferably a user selectable option made at the time a given page is bookmarked. Alternatively or additionally, the user is preferably given the option to activate/deactivate multilevel verification in a preference screen accessible from the browser menu for example.

The preferred embodiment of the invention has been described with reference to particular protocols, e.g., URLs and HTML pages, for clarity. However, it understood that any protocols, known or unknown, may be used to advantage by the invention.

While the foregoing is directed to the preferred embodiment of the present invention, other and further embodiments of the invention may be devised without departing from the basic scope thereof, and the scope thereof is determined by the claims that follow.

The invention claimed is:

1. A method of verifying a bookmark, comprising the steps:
   (a) storing, as a bookmark in at least a first data structure, a first network information address of a document having content;
   (b) identifying embedded network information addresses within the content;
   (c) automatically searching, at a predefined frequency, for the document located at the first network information address to determine whether the first network information address is retrievable;
   (d) wherein if the first network information address is retrievable, determining whether the document has been moved to a second network information address different from the first network information address; and
   (e) wherein if the first network information address is not retrievable, making the identified embedded network information addresses available to a user via the stored bookmark.

2. The method of claim 1, wherein the first network information address is a Uniform Resource Locator (URL).

3. The method of claim 1, wherein the document located at the first network information address is a Hypertext Markup Language (HTML) document.

4. The method of claim 1, wherein (b) is performed at a user-defined frequency.

5. The method of claim 1, wherein if the document has been moved to the second network information address, replacing the first network information address in the first data structure with the second network information address.

6. The method of claim 1, wherein determining whether the document has been moved to the second network information address comprises detecting only a single hypertext link in a forwarding document located at the first network information address.

7. The method of claim 6, further comprising determining whether the content has changed by comparing a stored first date to a second date returned by a server, wherein the first date is stored during step (a).

8. The method of claim 1, wherein if the document has not been moved to the second network information address, determining whether the content has changed.

9. The method of claim 8, wherein determining whether the content has changed comprises comparing a stored first date to a second date returned by a server, wherein the first date is stored during step (a).

10. The method of claim 1, the first data structure has at least a first data field related to the first network information address.

11. The method of claim 10, further comprising, storing each identified embedded network information address in a second data structure containing one or more second data fields which relate to the embedded network information addresses.

12. The method of claim 11, wherein the first data structure and the second data structure are the same.

13. The method of claim 11, further comprising generating a verification table containing the first data field and the one or more second data fields.

14. The method of claim 1, further comprising, storing each identified embedded network information address in the first data structure.

15. The method of claim 14, wherein (c) comprises attempting to download the document located at first network information address, wherein a successful attempt indicates that the first network information address is retrievable and an unsuccessful attempt indicates that the first network information address is irretrievable.

16. The method of claim 15, wherein if the document has been moved to the second network information address, replacing the first network information address in the first data structure with the second network information address; and wherein making the identified embedded network information addresses available to the user via the stored bookmark comprises replacing the first network information address in the first data structure with a temporary document containing the one or more embedded network information addresses.

17. The method of claim 15, wherein if (c) indicates that the first network information address is retrievable, determining whether the content has changed.

18. The method of claim 17, wherein determining whether the content has changed comprises comparing a first date stored in the first data structure to a second date returned by a server.

19. A computer implemented automated method for maintaining bookmarks, comprising:
   (a) storing, in a data structure, a bookmark to a network information address of a document having content;
   (b) scanning the content for one or more embedded network information addresses, wherein if any embedded network information addresses are found, storing the embedded network information addresses; and
   (c) periodically determining whether the network information address has changed and;
   (d) wherein if the network information address has changed:
      determining whether a forwarding network information address is provided; and if not, associating the bookmark with the embedded network information addresses.

20. The method of claim 19, further comprising performing (c) at a user-defined frequency.

21. The method of claim 19, wherein periodically determining whether the network information address has changed comprises attempting to download the document.

22. The method of claim 19, wherein the network information address is a URL and the document is an HTML document.

23. The method of claim 19, wherein periodically determining whether the network information address has changed comprises loading the network information address from the data structure and attempting to locate the document on a server, wherein a successful attempt indicates that the network information address has not changed and an unsuccessful attempt indicates that the network information address has changed.

24. The method of claim 23, wherein if the network information address has changed, and if the forwarding network information address is provided, replacing the bookmark network information address in the data structure with the forwarding network information address.

25. The method of claim 19, wherein if the network information address has not changed, determining whether the content has changed.

26. The method of claim 25, wherein determining whether the content has changed comprises comparing a first date stored in the data structure to a second date returned by a server.

27. A signal bearing medium for storing a program that when executed by a computer performs an operation comprising:
(a) downloading a bookmark network information address of a document having content;
(b) storing the bookmark network information address in a data structure;
(c) scanning the content for one or more embedded network information addresses, wherein if any embedded network information addresses are found, storing the embedded network information addresses in the data structure; and
(d) periodically determining whether the document is retrievable at the bookmark network information address, wherein:
  (i) if the information is not retrievable at the bookmark network information address, determining whether a forwarding network information address is provided, wherein if the forwarding network information address is provided, replacing the bookmark network information address in the data structure with the forwarding network information address, and wherein if a forwarding network information address is not provided, generating a backup document containing the embedded network information addresses stored in the data structure; and wherein
  (ii) if the document is retrievable at the bookmark network information address, determining whether the content has changed, wherein if the content has changed, repeating (c).

28. The program of claim 27, wherein the bookmark network information address is a URL.

29. The program of claim 27, wherein the document is an HTML document.

30. The program of claim 27, wherein determining the content has changed comprises comparing a first date stored in the data structure to a second date returned by a server.

31. The program of claim 27, wherein the bookmark network information address identifies a server computer connected to a client computer, and wherein the program is located on the client computer.

32. The program of claim 31, wherein the client computer and the server computer are the same computer system.

33. The program of claim 31, wherein the client computer and the server computer comprise different computer systems connected by a network.

34. The program of claim 31, wherein the data structure is stored on the client computer.

35. A computer implemented method of managing bookmarks, comprising:
(a) in response to a user request to bookmark a web page: storing a network address for the web page in a bookmark data structure;
storing each hypertext link embedded in the web page in the bookmark data structure in a manner which associates the embedded hypertext links and the web page; and
associating a graphical bookmark object of a bookmark menu with the web page; and
  (b) determining whether the web page has moved to a different network address;
  (c) if the web page has moved, determining whether an updated network address for the web page can be located; and
  (d) if the updated network address cannot be located, associating the graphical bookmark object with the stored embedded hypertext links of the web page.

36. The method of claim 35, wherein (b) is performed at a predefined frequency.

37. The method of claim 35, further comprising displaying the stored embedded hypertext links of the web page upon a user selection of the graphical bookmark object.

38. A method of maintaining access to information objects associated with a target document, comprising:
(a) in response to a user request, storing a reference to the target document containing pointers to a plurality of information objects, whereby a user viewing the target document can access each of the plurality of information objects from the target document via the pointers;
(b) maintaining the pointers in a data structure at a separate storage location from the target document;
(c) automatically searching, at a predefined frequency, for the target document on the basis of the reference to determine whether the target document is retrievable; and
(d) when the target document is not retrievable, automatically making the pointers available to a user via the stored reference, whereby the user has access to the plurality of information objects even though the target document is not retrievable.

39. The method of claim 38, wherein the target document is a network document.

40. The method of claim 38, wherein the target document is a network document and the reference is a Uniform Resource Locator (URL).

41. The method of claim 38, wherein the target document is a Hypertext Markup Language (HTML) document.

42. The method of claim 38, wherein the data structure contains only the pointers and no other content from the target document.

* * * * *